(12) United States Patent  
Li et al.

(10) Patent No.: US 8,582,947 B2  
(45) Date of Patent: Nov. 12, 2013

(54) METHOD AND APPARATUS FOR PROCESSING VIDEO AND AUDIO DATA RECEIVED IN DECODING SYSTEM

(75) Inventors: Kui Li, Shenzhen (CN); Huibin Xia, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 391 days.

(21) Appl. No.: 13/006,187

(22) Filed: Jan. 13, 2011

(65) Prior Publication Data

US 2011/0110651 A1    May 12, 2011

Related U.S. Application Data

(63) Continuation of application No. PCT/CN2009/073017, filed on Jul. 31, 2009.

(30) Foreign Application Priority Data

Aug. 11, 2008    (CN) .......................... 2008 1 0118095

(51) Int. Cl.
*H04N 5/935*    (2006.01)
*H04N 5/932*    (2006.01)
*H04N 5/92*    (2006.01)
*H04N 5/917*    (2006.01)

(52) U.S. Cl.
USPC ........... 386/211; 386/214; 386/217; 386/220; 386/326; 386/330; 386/353

(58) Field of Classification Search
USPC .......... 386/211, 214, 217, 220, 326, 330, 353
See application file for complete search history.

(56) References Cited

U.S. PATENT DOCUMENTS 5,771,075 A * 6/1998 Rim et al. ...................... 348/512  
5,812,201 A * 9/1998 Yoo ............................. 348/423.1

(Continued)

FOREIGN PATENT DOCUMENTS

CN    1201335 A    12/1998  
CN    1436001 A    8/2003

(Continued)

OTHER PUBLICATIONS

Extended European Search Report issued in corresponding European Patent Application No. 09806345.6, mailed Aug. 26, 2011.

(Continued)

*Primary Examiner* — Daquan Zhao  
(74) *Attorney, Agent, or Firm* — Brinks Hofer Gilson & Lione

(57) ABSTRACT

A method and an apparatus for processing video and audio data received in a decoding system are provided. The method includes the following steps. When a program clock reference (PCR) is unavailable in the system, a system time clock (STC) is recovered by using a presentation time stamp (PTS) of video or audio data, or a linear combination result of the PTS of the video data and the PTS of the audio data. The STC is compared with the PTSs of the currently captured and audio data, and a current data processing mode is determined. A difference between the PTS of the video data and the PTS of the audio data is monitored. An absolute value of the difference is compared with a preset threshold value, and when the absolute value is greater than or equal to the threshold value, an asynchronous play mode is adopted as a system play mode; otherwise, a synchronous play mode is adopted as the system play mode. Through the method and apparatus, synchronization of video signals and audio signals can be achieved when the PCR is unavailable in the decoding system.

9 Claims, 7 Drawing Sheets

(56) References Cited

U.S. PATENT DOCUMENTS

| | | | |
|---|---|---|---|
| 6,339,675 B1 | 1/2002 | Shimizu et al. | |
| 8,229,270 B2* | 7/2012 | Kim et al. | 386/201 |
| 2005/0182511 A1 | 8/2005 | Bader et al. | |
| 2005/0185929 A1 | 8/2005 | Kang et al. | |
| 2006/0285822 A1* | 12/2006 | Kanemaru et al. | 386/83 |
| 2008/0008100 A1 | 1/2008 | Yamada | |

FOREIGN PATENT DOCUMENTS

| | | |
|---|---|---|
| CN | 1710963 A | 12/2005 |
| CN | 1976448 A | 6/2007 |
| CN | 101047842 A | 10/2007 |
| CN | 101340591 A | 1/2009 |
| EP | 1071290 A2 | 1/2001 |
| EP | 1289306 A2 | 3/2003 |
| EP | 1615433 A1 | 1/2006 |
| JP | 2002281445 A | 9/2002 |
| RU | 2006132346 | 3/2008 |
| RU | 2006133641 | 3/2008 |
| RU | 2337415 C2 | 10/2008 |
| RU | 2377669 C2 | 12/2009 |
| WO | WO 2010/017742 A1 | 2/2010 |

OTHER PUBLICATIONS

Written Opinion of the International Searching Authority issued in corresponding PCT Patent Application No. PCT/CN2009/073017, mailed Nov. 5, 2009.

Office Action issued in corresponding Chinese Patent Application No. 200810118095.1, mailed Jul. 31, 2009.

Office Action issued in corresponding Russian Patent Application No. 2011106330, mailed Dec. 6, 2011.

Notice of Allowance issued in corresponding Russian Patent Application No. 2011106330, mailed Dec. 4, 2012.

Notice of Allowance issued in corresponding Chinese Patent Application No. 200810118095.1; mailed Nov. 15, 2010.

Granted claims from corresponding Chinese Patent Application No. 200810118095.1 (including Verification of Translation and granted document from corresponding Chinese Application), Jul. 31, 2009.

* cited by examiner

METHOD AND APPARATUS FOR PROCESSING VIDEO AND AUDIO DATA RECEIVED IN DECODING SYSTEM

CROSS-REFERENCE TO RELATED APPLICATIONS

The application is a continuation of International Application No. PCT/CN2009/073017, filed on Jul. 31, 2009, which claims priority to Chinese Patent Application No. 200810118095.1, filed on Aug. 11, 2008, both of which are hereby incorporated by reference in their entireties.

FIELD OF THE DISCLOSURE

The present disclosure relates to the field of Moving Picture Experts Group (MPEG)-2 technology, and more particularly to a method and an apparatus for processing video and audio data received in a decoding system, when a program clock reference (PCR) is unavailable.

BACKGROUND

In MPEG-2, the functions of system clock recovery and video and audio data synchronization are mainly implemented according to a Program Clock Reference (PCR) and Presentation Time Stamps (PTSs) of video and audio data. The PCR is usually set in header information of a transmission stream, and is used to recover a System Time Clock (STC) the same as an encoding end. The PTS is mainly set in header information of a Packetized Elementary Stream, and is used to indicate presentation time of current data.

It is specified in MPEG-2 that both the PCR and the PTS in the transmission stream are sampled values of the same system clock. At a decoding end, a local STC is recovered according to a captured PCR, to serve as a reference for controlling synchronization of video and audio data. Then, a captured PTS of a certain stream is compared with the STC, and the received data is processed according to a comparison result. The process specifically includes the following.

(1) If PTS>STC, it is determined that the data does not reach the presentation time, and the data needs to be buffered in a buffer.

(2) If PTS=STC, it is determined that currently the data needs to be presented.

(3) If PTS<STC, it indicates that the data expires, and needs to be discarded.

Through the preceding process, the video data and the audio data are synchronized with their respective STC, so that the video data and the audio data are synchronously played.

In a case that the PCR cannot be obtained in the system, a terminal MPEG-2 receiver usually plays the corresponding data by directly adopting an asynchronous play mode.

In the implementation of the present disclosure, the inventor found that the prior art at least has the following problem: when the PCR cannot be obtained in the system, the video and audio signals are played by directly adopting the asynchronous play mode, that is, the video information and the audio information cannot be synchronously played, resulting in that the receiving effect of the video signals and the audio signals is affected.

SUMMARY OF THE DISCLOSURE

The embodiments of the present disclosure provide a method and an apparatus for processing video and audio data received in a decoding system, which are capable of achieving synchronization of video signals and audio signals when a PCR is unavailable in the decoding system.

In an embodiment, the present disclosure provides a method for processing video and audio data received in a decoding system. The method includes the following steps:

When a PCR is unavailable in the system, an STC is recovered by using a PTS of the video data or a PTS of the audio data, or a linear combination result of the PTS of the video data and the PTS of the audio data.

The STC is compared with the PTSs of the currently captured video and audio data, and a mode for processing the currently captured video and audio data is determined.

In an embodiment, the present disclosure further provides an apparatus for processing video and audio data received in a decoding system. The apparatus includes an STC recovery module and a data processing module.

The STC recovery module is configured to recover an STC by using a PTS of video or audio data, or a linear combination result of the PTS of the video data and the PTS of the audio data, when a PCR is unavailable in the system.

The data processing module is configured to compare the STC obtained by the STC recovery module with the PTSs of the currently captured video and audio data, and determine a mode for processing the currently captured video and audio data according to a comparison result.

It can be seen from the technical solution of the present disclosure that, by adopting the technical solution of the present disclosure, when the PCR is unavailable in the system, and the PTSs of the video and audio signals are normal, the video and audio signals are synchronized normally; even if the PTSs of the video and audio signals are abnormal, the synchronization of the video and audio signals is significantly improved such that the synchronization is well maintained.

BRIEF DESCRIPTION OF THE DRAWINGS

To make the technical solution under the present disclosure clearer, the accompanying drawings for illustrating the embodiments of the present disclosure or the prior art are described below. Evidently, the accompanying drawings are for the exemplary purpose only, and those skilled in the art can derive other drawings from such accompanying drawings without any creative effort.

DETAILED DESCRIPTION OF THE EMBODIMENTS

The following detailed description is directed to the technical solution of the present disclosure with reference to the accompanying drawings. However, the embodiments to be described are only some embodiments of the present disclosure. Person having ordinary skill in the art can derive other embodiments from the embodiments given herein without making any creative effort, and all such embodiments are covered in the protection scope of the present disclosure.

In an embodiment, the present disclosure provides a method for processing video and audio data received in a decoding system, which includes the following steps. When a PCR is unavailable in the system, an STC is recovered by using a PTS of video or audio data, or a linear combination result of the PTS of the video data and the PTS of the audio data. The STC is compared with the PTSs of the currently captured video and audio data, determine a mode for processing the currently captured video and audio data.

Further, after the mode for processing the currently captured video and audio data is determined, a difference between the PTS of the video data and the PTS of the audio data in the data to be played is monitored. An absolute value of the difference is compared with a preset threshold value, and an asynchronous play mode is adopted as a system play mode when the absolute value is greater than or equal to the threshold value; a synchronous play mode is adopted as the system play mode when the absolute value is smaller than the threshold value.

For ease of understanding of the embodiments of the present disclosure, the corresponding application embodiments are described in detail in the following with reference to the accompanying drawings.

Figure 1:
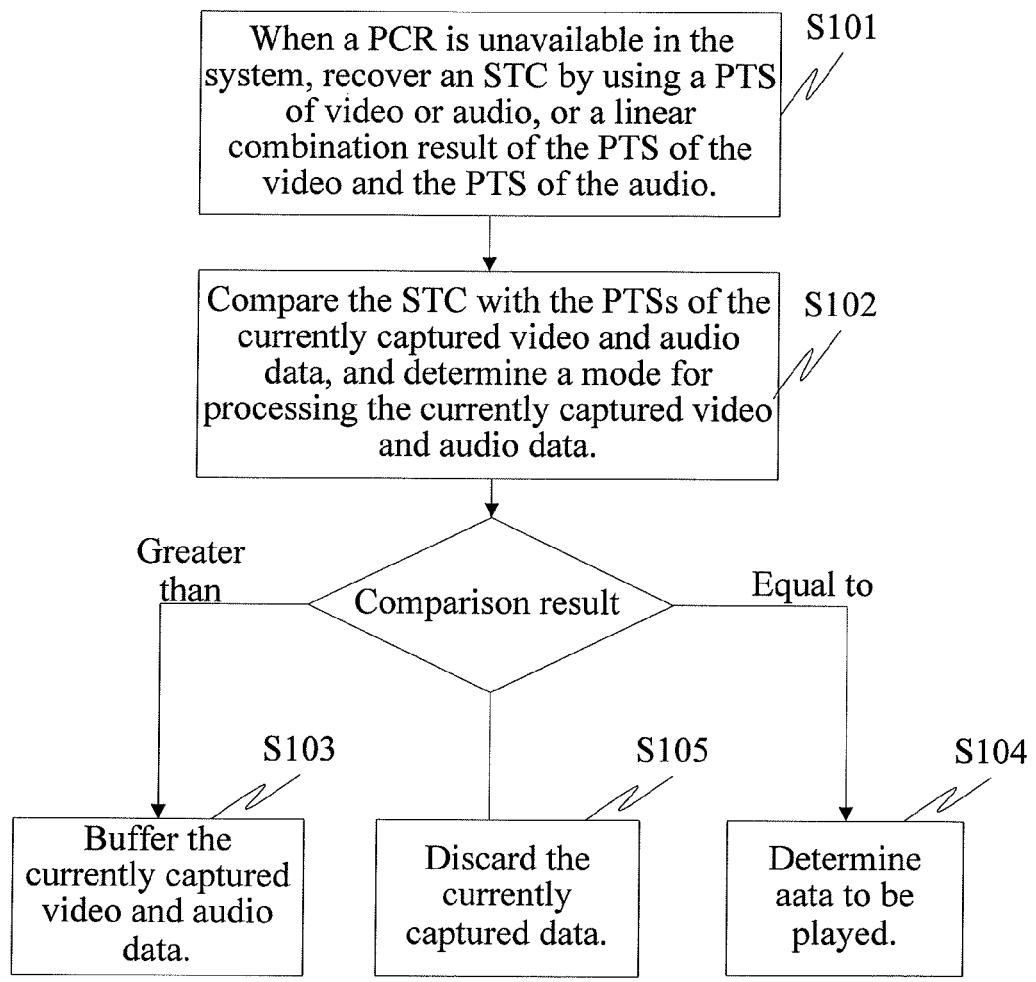
FIG. 1 is a flow chart of data processing in a method according to an embodiment of the present disclosure.

In a method for processing video and audio data received in a decoding system according to an embodiment of the present disclosure, a process of data processing is shown in FIG. 1.

Step S101: When a PCR is unavailable in the system, recover an STC by using a PTS of video or audio data, or a linear combination result of the PTS of the video data and the PTS of the audio data.

Because the audio data has a more stable bit rate than the data, the STC may be recovered by using the PTS of the audio in the embodiment of the present disclosure.

A method for recovering the STC by using the linear combination result of the PTS of the video data and the PTS of the audio data includes computing a value of the linear combination result according to a formula relation, and recovering the STC by using the value of the linear combination result. The formula relation for computing the linear combination result PTS' of the PTS of the video data and the PTS of the audio data is:

$$PTS' = \gamma * vPTS + (1-\gamma) * aPTS \qquad (1),$$

where, vPTS is the PTS of the video data, aPTS is the PTS of the audio data, and $\gamma$ is a linear coefficient, and $\gamma \in [0,1]$. The PTS' is used to recover the STC.

Step S102: Compare the STC with the PTSs of the currently captured video and audio data, and determine a mode for processing the currently captured video and audio data.

A comparison result is as follows:

After the STC is compared with the PTSs of the currently captured video and audio data, if the PTSs of the currently captured video and audio data are greater than the STC, it indicates that the currently captured data does not reach a play time, and step S103 is performed; if the PTSs of the currently captured video and audio data are smaller than the STC, it indicates that the currently captured video and audio data expires, and step S105 is performed; and when the PTSs of the currently captured video and audio data are equal to the STC, step S104 is performed.

Step S103: Buffer the currently captured video and audio data.

Step S104: Determine data to be played.

Step S105: Discard the currently captured data.

During the preceding process, the objective of comparing the STC with the PTS of the video data and the PTS of the audio data is to control a state of the current data and presentation time of the current data.

Figure 2:
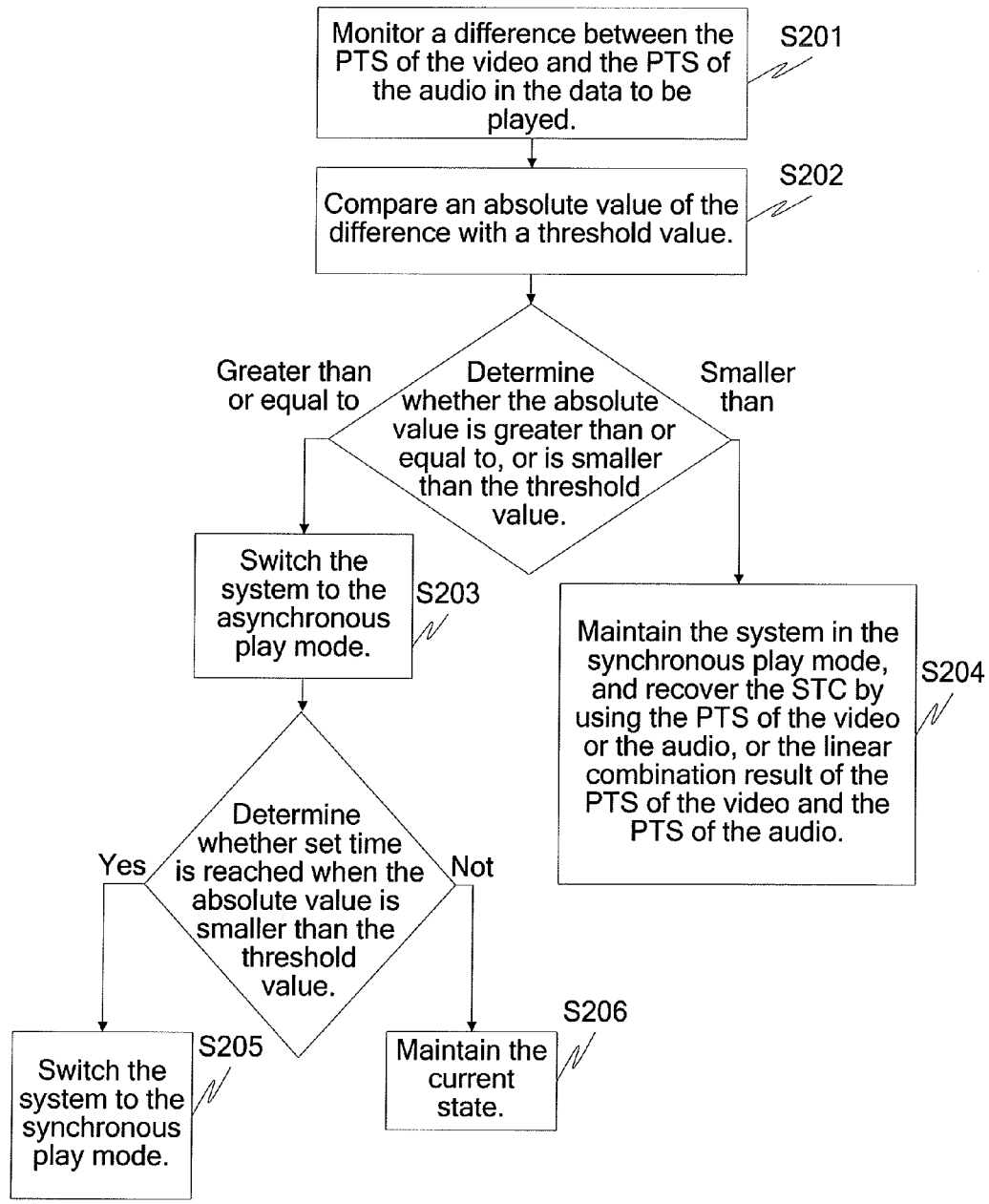
FIG. 2 is a flow chart of mode switching in a method according to an embodiment of the present disclosure.

In a method for processing video and audio data received in a decoding system according to an embodiment of the present disclosure, a process of switching a system play mode is as shown in FIG. 2. The method includes the following steps:

Step S201: Monitor a difference between the PTS of the video data and the PTS of the audio data in the data to be played.

Step S202: Compare an absolute value of the difference with a preset threshold value. Adopt an asynchronous play mode as a system play mode when the absolute value is greater than or equal to the threshold value, that is, perform step S203. Adopt a synchronous play mode as the system play mode when the absolute value is smaller than the threshold value, that is, perform step S204.

The threshold value L is set according to sizes of buffers allocated to the video stream and the audio stream and bit rates of video and audio streams, and a computing formula relation is as follows:

$$L = \alpha * [(1-\gamma) * vC/vR + \gamma * aC/aR] * T \qquad (2),$$

where, $\alpha$ is a tolerance factor having a value range of [0,1], and it is suggested that a value of $\alpha$ is 0.5.

$\gamma$ is consistent with that of Formula (1), vC is the size of the buffer of the video stream, vR is the bit rate of the video stream, aC is the size of the buffer of the audio stream, aR is the bit rate of the audio stream, and T is a constant having a value of 90 and being a tick of each millisecond of the PTS.

Step S203: Adopt the asynchronous play mode as the system play mode.

Step S204: Adopt the synchronous play mode as the system play mode.

After the synchronous play mode is adopted as the system play mode, the STC is corrected by using the PTS of the video or the audio data, or the linear combination result of the PTS of the video data and the PTS of the audio data.

Step S205: Monitor the difference between the PTS of the video data and the PTS of the audio data after the system adopts the asynchronous play mode (Step S203). Switch the system to the synchronous play mode when the absolute value of the difference is smaller than the threshold value and a preset time is reached; perform step S206 when the absolute value of the difference is greater than or equal to the threshold value and the preset time is not reached.

After the system is switched to the asynchronous play mode, the STC is no longer compared with the PTS of the video data and the PTS of the audio data to control the processing state of the current data and the presentation time of the current data.

The preset time ranges from 10 to 60 seconds.

Step S206: Maintain the current play mode when the absolute value of the difference is smaller than the threshold value but the preset time is not reached.

It should be noted that step S205 and step S206 may also be as follows: after the synchronous play mode is adopted as the system play mode, the system is switched to the asynchronous play mode when it is monitored that the absolute value of the difference is greater than the threshold value and the preset time is reached; the system is maintained in the current synchronous play mode when it is monitored that the absolute value of the difference is smaller than or equal to the threshold value and the preset time is not reached.

Figure 3A:
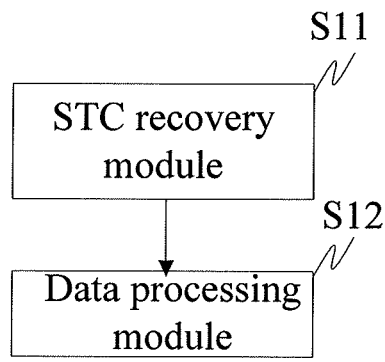
FIG. 3A is a first schematic structural view of an apparatus according to an embodiment of the present disclosure.

In an embodiment, the present disclosure provides an apparatus for processing video and audio data received in a decoding system (referring to FIG. 3A). The apparatus includes an STC recovery module S11 and a data processing module S12.

The STC recovery module S11 is configured to recover an STC by using a PTS of video or audio data, or a linear combination result of the PTS of the video data and the PTS of the audio data, when a PCR is unavailable in the system.

The data processing module S12 is configured to compare the STC with the PTSs of the currently captured video and audio data, determine a mode for processing the currently captured video and audio data according to a comparison result.

Figure 3B:
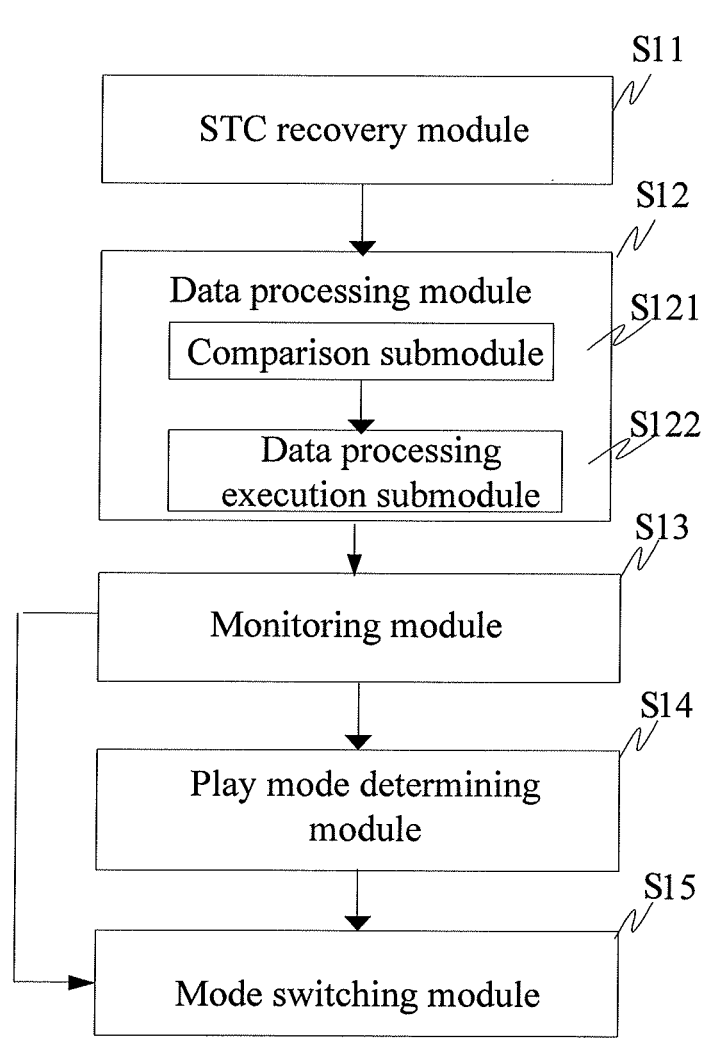
FIG. 3B is a second schematic structural view of an apparatus according to an embodiment of the present disclosure.

Referring to FIG. 3B, the data processing module S12 includes a comparison submodule S121 and a data processing execution submodule S122.

The comparison submodule S121 is configured to compare the STC obtained by the STC recovery module with the PTS of the video data and the PTS of the audio data.

The data processing execution submodule S122 is configured to, according to a comparison result of the comparison submodule, discard the currently captured video and audio data, when the STC is greater than the PTS of the currently captured video or audio data; buffer the currently captured data, when the STC is smaller than the PTS of the currently captured video or audio data; and determine data to be played, when the STC is equal to the PTS of the currently captured video or audio data.

Further, referring to FIG. 3B, the apparatus according to the present disclosure may further include a monitoring module S13 and a play mode determining module S14.

The monitoring module S13 is configured to monitor a difference between the PTS of the video data and the PTS of the audio data in the data to be played, after the mode for processing the currently captured video and audio data is determined.

The play mode determining module S14 is configured to compare an absolute value of the difference with a preset threshold value, adopt an asynchronous play mode as a system play mode when the absolute value is greater than or equal to the threshold value, and adopt a synchronous play mode as the system play mode when the absolute value is smaller than the threshold value.

Referring to FIG. 3B, the apparatus according to the present disclosure may further include a mode switching module S15, configured to switch the system play mode to the synchronous play mode after the play mode determining module determines to adopt the asynchronous play mode as the system play mode, and when the monitoring module monitors that the absolute value of the difference is smaller than the threshold value and the preset time is reached; maintain the system in the current asynchronous play mode after the play mode determining module determines to adopt the asynchronous play mode as the system play mode, and when the monitoring module monitors that the absolute value of the difference is greater than or equal to the threshold value and the preset time is not reached.

Figure 3C:
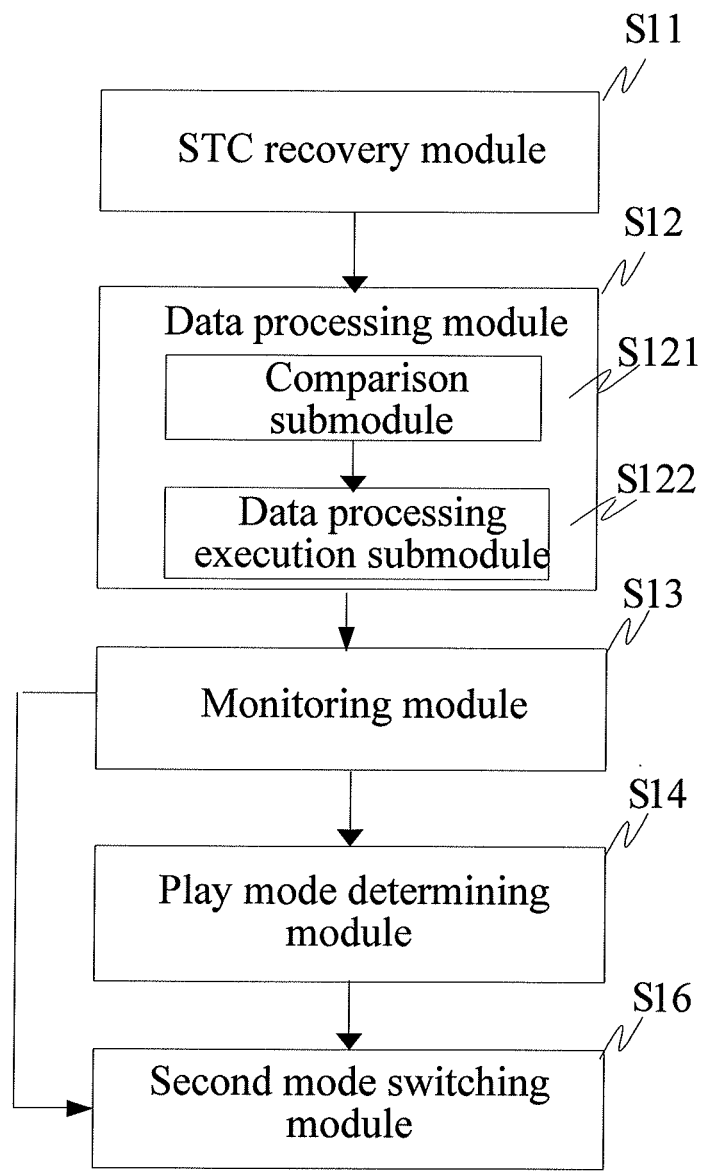
FIG. 3C is a third schematic structural view of an apparatus according to an embodiment of the present disclosure.

Alternatively, referring to FIG. 3C, the apparatus according to the present disclosure further includes a second mode switching module S16, configured to switch the system to the asynchronous play mode after the play mode determining module determines to adopt the synchronous play mode as the system play mode, and when the monitoring module monitors that the absolute value of the difference is greater than the threshold value and the preset time is reached; maintain the system in the current synchronous play mode after the play mode determining module determines to adopt the synchronous play mode as the system play mode, and when the monitoring module monitors that the absolute value of the difference is smaller than or equal to the threshold value and the preset time is not reached.

For ease of understanding of the embodiments of the present disclosure, the corresponding application embodiments are described in detail in the following with reference to the accompanying drawings.

In Formula (1) and Formula (2), $\gamma$ is the linear coefficient, the specific value of $\gamma$ is determined by an operator according to experience, and a method for selecting a value of $\gamma$ is as follows.

When $\gamma=1$, it indicates that the STC is recovered by using the PTS of the video stream.

When $\gamma=0$, it indicates that the STC is recovered by using the PTS of the audio stream.

When $\gamma \in (0, 1)$, it indicates that the STC is recovered by using the linear combination result PTS' of the PTS of the video stream and the PTS of the audio stream.

vPTS represents the PTS of the video stream, and aPTS represents the PTS of the audio stream.

Specific implementation solutions corresponding to three different values of $\gamma$ are described in detail in the following with reference to the operation process according to the embodiments of the present disclosure.

Figure 4:
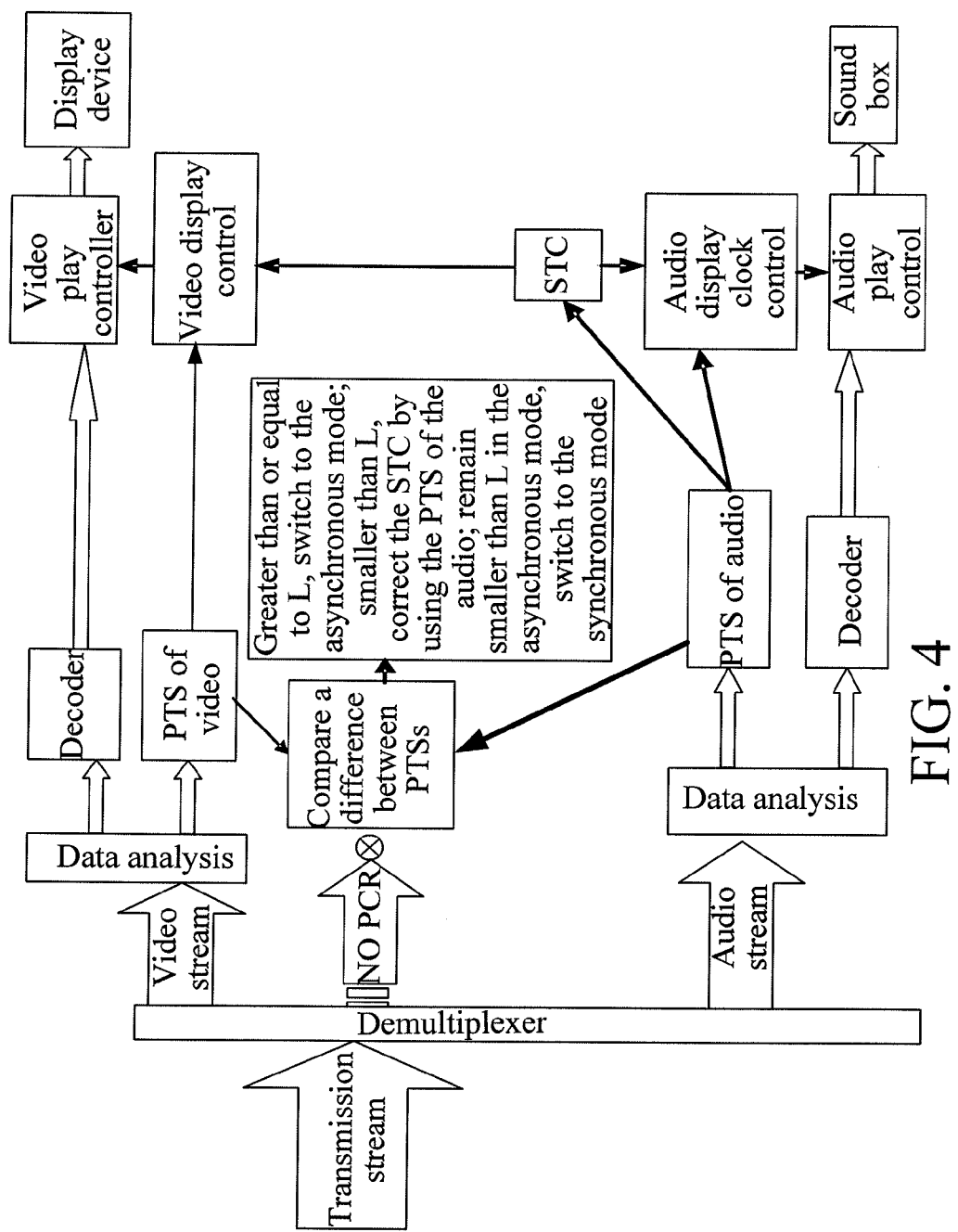
FIG. 4 is a functional diagram of a method according to an embodiment of the present disclosure, when $\gamma=0$.

1) When $\gamma=0$ (referring to FIG. 4), the STC is recovered by using the PTS of the audio stream, and an implementation procedure is as follows.

After a transmission stream passes through a demultiplexer, the video stream and the audio stream are separated, and when the program does not have the PCR, the PTS of the audio stream is analyzed, and the local STC is recovered by using the PTS.

After the data in the video stream arrives, the PTS thereof is analyzed, and then the PTS of the currently captured video stream is compared with the recovered STC, and the current data processing mode according to the comparison result is determined. It can be seen that, when the PTS of the audio is compared with the STC, it is equivalent to compare with itself, and if the PTS of the video stream is greater than the STC, the data is buffered; if the PTS of the video stream is smaller than the STC, the data is discarded; and if the PTS of the video stream is equal to STC, the data to be played is determined.

In the data to be played, the absolute value of the difference between the PTS of the video stream and the PTS of the audio stream is monitored, and the difference between the PTS of the video stream and the PTS of the audio stream is compared. If the absolute value of the difference is greater than or equal to L, indicating that the video stream cannot be synchronized with the audio stream, the play mode is switched to the asynchronous play mode. At this time, the PTSs of the video stream and the audio stream are no longer compared with the STC to control the current data processing mode. However, because the previous play mode is the synchronous play mode, the synchronization can be well maintained within a period of time after the mode is switched to the asynchronous mode. If the absolute value of the difference is smaller than L, the STC is corrected by using the PTS of audio.

After the mode is switched to the asynchronous mode, the difference between the PTS of the video stream and the PTS of the audio stream is continued to be monitored, and if the absolute value of the difference remains smaller than L during the preset time (for example, 30 seconds), indicating that the video stream is again synchronous with the audio stream, the mode is switched to the synchronous play mode.

Figure 5:
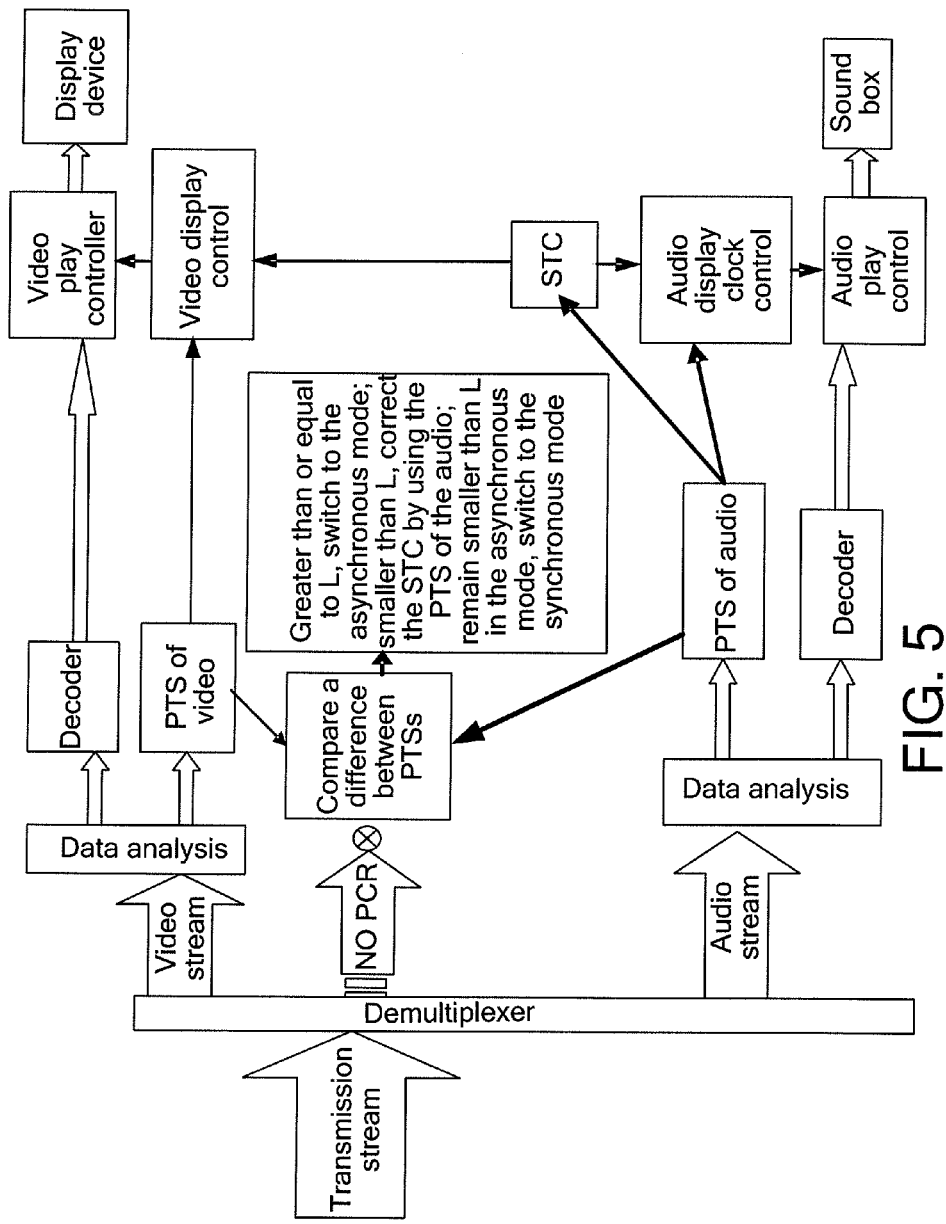
FIG. 5 is a functional diagram of a method according to an embodiment of the present disclosure, when $\gamma=1$.

2) When γ=1 (referring to FIG. 5), the STC is recovered by using the PTS of the video stream, and an implementation procedure is as follows.

After a transmission stream passes through a demultiplexer, the video stream and the audio stream are separated, and when the program does not have the PCR, the PTS of the video stream is analyzed, and the local STC is recovered by using the PTS.

After the data in the audio stream arrives, the PTS of the currently captured audio stream is compared with the recovered STC, and the current data processing mode according to the comparison result is determined. When the PTS of the video stream is compared with the STC, it is equivalent to compare with itself, and if the PTS of the audio stream is greater than the STC, the data is buffered; if the PTS of the audio stream is smaller than the STC, the data is discarded; and if the PTS of the audio stream is equal to STC, the data to be played is determined.

In the data to be played, the absolute value of the difference between the PTS of the video stream and the PTS of the audio stream is monitored, and the difference between the PTS of the video stream and the PTS of the audio stream is compared. If the absolute value of the difference is greater than or equal to L, indicating that the video stream cannot be synchronized with the audio stream, the play mode is switched to the asynchronous play mode. In such case, the PTSs of the video stream and the audio stream are no longer compared with the STC to control the current data processing mode. However, because the previous play mode is the synchronous play mode, the synchronization can be well maintained within a period of time after the mode is switched to the asynchronous mode. If the absolute value of the difference is smaller than L, the STC is corrected by using the PTS of audio.

After the mode is switched to the asynchronous mode, the difference between the PTS of the video stream and the PTS of the audio stream is continued to be monitored, and if the absolute value of the difference remains smaller than L during the preset time (for example, 30 seconds), indicating that the video stream is again synchronous with the audio stream, the mode is switched to the synchronous play mode.

Figure 6:
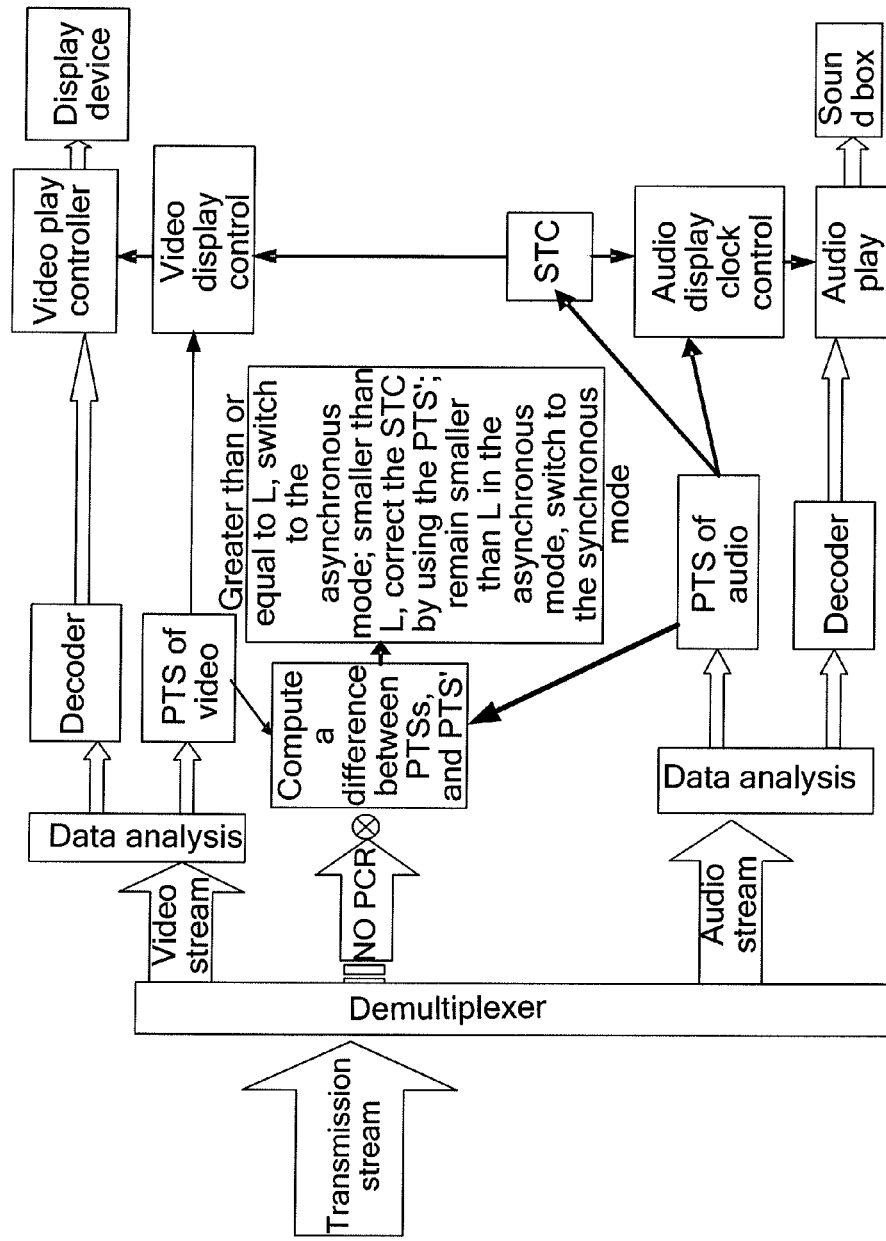
FIG. 6 is a functional diagram of a method according to an embodiment of the present disclosure, when $\gamma=0$ to $1$.

3) When γ is between 0 and 1 (referring to FIG. 6), the STC is recovered by using the linear combination result PTS' of the PTS of the video stream and the PTS of the audio stream.

After a transmission stream passes through a demultiplexer, the video stream and the audio stream are separated, and when the program does not have the PCR, firstly, the linear combination result PTS' of the PTS of the video stream and the PTS of the audio stream is computed to recover the STC. After the data in the audio stream and the video stream arrives, the PTS of the video stream and the PTS of the audio stream each is compared with the recovered STC, to control the current data processing mode. When the PTS of the video stream and the PTS of the audio stream are equal to the STC, the data to be played is determined. Meanwhile, the absolute value of the difference between the PTS of the video stream and the PTS of the audio stream in the data to be played is monitored, and the difference between the PTS of the video stream and the PTS of the audio stream is compared. If the absolute value of the difference is greater than or equal to L, the system is switched to the asynchronous play mode. At this time, the PTSs of the video stream and the audio stream are no longer compared with the STC to control the current data processing mode. If the absolute value of the difference is smaller than L, the STC is corrected by using the linear combination result PTS', and the current synchronous play mode is maintained.

After the system is switched to the asynchronous mode, the difference between the PTS of the video stream and the PTS of the audio stream is continued to be monitored, and if the absolute value of the difference is smaller than the threshold value L (but the preset time is not reached), the system is maintained in the asynchronous play mode; and if the absolute value of the different value remains smaller than L during the preset time (for example, 30 seconds), indicating that the video stream is again synchronous with the audio stream, the system is switched to the synchronous play mode.

In the synchronous mode, the synchronization is implemented as possible by using buffered data of a video buffer and an audio buffer, and the disadvantage is that the recovery of the STC requires dynamically computing the PTS', which adds complexity.

Person of ordinary skill in the art may understand that all or part of the steps of the method according to the embodiments of the present disclosure may be implemented by a program instructing relevant hardware. The program may be stored in a computer readable storage medium. When the program runs, the steps of the method according to the embodiments of the present disclosure are performed. The storage medium may be a magnetic disk, a Compact Disk Read-Only Memory (CD-ROM), a Read-Only Memory (ROM), or a Random Access Memory (RAM).

In conclusion, the above are merely exemplary embodiments of the present disclosure. However, the scope of the present disclosure is not limited thereto. Changes or replacements readily apparent to persons skilled in the prior art within the technical scope of the present disclosure should fall within the scope of the present disclosure. Therefore, the protection scope of the present disclosure is subject to the appended claims.

What is claimed is:

1. A method for processing video and audio data received in a decoding system, comprising:
    recovering a system time clock (STC) by using a linear combination result of a presentation time stamp (PTS) PTS of a video data and the PTS of the audio data, when a program clock reference (PCR) is unavailable in the system; and
    comparing the STC with the PTSs of the currently captured video and audio data; and,
    determining data to be played in the currently captured video and audio data when the PTSs of the currently captured video and audio data are equal to the STC.

2. The method according to claim 1, further comprising:
    monitoring a difference between the PTS of the video data and the PTS of the audio data of the data to be played; and
    comparing an absolute value of the difference with a set threshold value, and adopting an asynchronous play mode as a system play mode when the absolute value is greater than or equal to the threshold value; adopting a synchronous play mode as the system play mode when the absolute value is smaller than the threshold value.

3. The method according to claim 2, wherein after the adopting the synchronous play mode as the system play mode, the method further comprises correcting the STC by using the PTS of the video or the audio data, or the linear combination result of the PTS of the video data and the PTS of the audio data.

4. The method according to claim 2,
    after the adopting the asynchronous play mode as the system play mode, switching the system to the synchronous play mode when monitoring that the absolute value of the difference is smaller than the threshold value and a preset time is reached; and maintaining the system in the current asynchronous play mode when monitoring that the absolute value of the difference is greater than or equal to the threshold value and the preset time is not reached.

5. The method according to claim 2, wherein the formula for computing the threshold value is:

threshold value=$\alpha*[(1-\gamma)*vC/vR+\gamma*aC/aR]*T$, $\alpha$ is a tolerance factor having a value range of (0,1), $\gamma$ is a linear coefficient having a value range of (0,1), vC is a size of a buffer of a video stream, vR is a bit rate of the video stream; aC is a size of a buffer of an audio stream; aR is a bit rate of the audio stream; and T is a constant value being a tick of each millisecond of the PTS.

6. The method according to claim 1, wherein the recovering the STC by using the linear combination result of the PTS of the video data and the PTS of the audio comprises: computing a value of the linear combination result according to a formula, wherein the formula for computing the linear combination result PTS' of the PTS of the video data and the PTS of the audio data is:

PTS'=$\gamma*vPTS+(1-\gamma)*aPTS$;

vPTS is the PTS of the video data, aPTS is the PTS of the audio data, and $\gamma$ is a linear coefficient having a value range of (0,1) and recovering the STC by using the value of the linear combination result.

7. An apparatus for processing video and audio data received in a decoding system, comprising a system time clock (STC) recovery module and a data processing module, wherein the STC recovery module is configured to recover an STC by using a linear combination result of a presentation time stamp (PTS) of the video data and a PTS of the audio data, when a program clock reference (PCR) is unavailable in the system; and the data processing module is configured to compare the STC obtained by the STC recovery module with the PTSs of the currently captured video and audio data, and determine data to be played in the currently captured video and audio data when the PTSs of the currently captured video and audio data are equal to the STC.

8. The apparatus according to claim 7, further comprising a monitoring module and a play mode determining module, wherein the monitoring module is configured to monitor a difference between the PTS of the video data and the PTS of the audio data in the data to be played; and the play mode determining module is configured to compare an absolute value of the difference monitored by the monitoring module with a set threshold value, and adopt an asynchronous play mode as a system play mode when the absolute value is greater than or equal to the threshold value; adopt a synchronous play mode as the system play mode when the absolute value is smaller than the threshold value.

9. The apparatus according to claim 8, further comprising:
a mode switching module, configured to switch the system play mode to the synchronous play mode after the play mode determining module determines to adopt the asynchronous play mode as the system play mode, and when the monitoring module monitors that the absolute value of the difference is smaller than the threshold value and a preset time is reached; maintain the system in the current play mode after the play mode determining module determines to adopt the asynchronous play mode as the system play mode, and when the monitoring module monitors that the absolute value of the difference is greater than or equal to the threshold value and the preset time is not reached.

\* \* \* \* \*